United States Patent
Kunimatsu et al.

(10) Patent No.: US 7,431,578 B2
(45) Date of Patent: Oct. 7, 2008

(54) VERTICAL INJECTION MOLDING MACHINE

(75) Inventors: Kiyoshi Kunimatsu, Akashi (JP); Yuichiro Kanda, Akashi (JP)

(73) Assignee: Toyo Machinery & Metal Co., Ltd., Hyogo (JP)

( * ) Notice: Subject to any disclaimer, the term of this patent is extended or adjusted under 35 U.S.C. 154(b) by 331 days.

(21) Appl. No.: 11/389,957

(22) Filed: Mar. 27, 2006

(65) Prior Publication Data

US 2007/0224304 A1 Sep. 27, 2007

(30) Foreign Application Priority Data

Apr. 11, 2005 (JP) ............................. 2005-113474
Feb. 28, 2006 (JP) ............................. 2006-052008

(51) Int. Cl.
*B29C 45/80* (2006.01)

(52) U.S. Cl. ..................... 425/135; 425/574; 425/575; 425/576

(58) Field of Classification Search ................ 425/135, 425/574, 575, 576
See application file for complete search history.

(56) References Cited

U.S. PATENT DOCUMENTS 5,217,662 A * 6/1993 Yamamura et al. .......... 425/589
6,402,504 B1 * 6/2002 Hahn et al. .................. 425/574

FOREIGN PATENT DOCUMENTS

JP 2002-172646 6/2002

* cited by examiner

*Primary Examiner*—Tim Heitbrink
(74) *Attorney, Agent, or Firm*—Fildes & Outland, P.C.

(57) ABSTRACT

The invention provides a vertical injection molding machine capable of periodically feeding lubricant to sliding portions of the turntable to maintain a substantially constant turntable slide resistance and also capable of determining the position of the repeatedly revolving turntable. During operation of a vertical injection molding machine 1, lubricant is periodically fed from a pump 30 to slide portions S of the revolving turntable 14 so as to maintain the slide resistance of the sliding portions S substantially constant. Further, a motor control means 51 resets the count of pulses output from an encoder 29 at a timing at which the number of revolutions of a servomotor 25 and the number of revolutions of the turntable 14 are integers, so that it is possible to prevent pulse errors from accumulating even when the turntable 14 is revolved many times in the same direction.

1 Claim, 10 Drawing Sheets

FIG.8

| No. | NUMBER OF REVOLUTIONS OF TURNTABLE 14 (n) | ANGLE OF TURNTABLE 14 (DEGREE, WITHIN SINGLE REVOLUTION) | MULTIPLE REVOLUTION COUNT STORAGE UNIT (HIGH ORDER DIGIT) 29a OF ENCODER 29 (NUMBER OF REVOLUTIONS OF SERVOMOTOR) | SINGLE-REVOLUTION PULSE COUNT STORAGE UNIT (LOW ORDER DIGIT) 29b OF ENCODER 29 |
|---|---|---|---|---|
| 1 | 0 | 0 | 0 | 0 |
| 2 | 0.058333 | 21 | 0 (0.5) | 16384 |
| 3 | 0.116667 | 42 | 1 | 0 (32768) |
| 4 | 0.233333 | 84 | 2 | 0 |
| 5 | 0.35 | 126 | 3 | 0 |
| 6 | 0.466667 | 168 | 4 | 0 |
| 7 | 0.583333 | 210 | 5 | 0 |
| 8 | 0.7 | 252 | 6 | 0 |
| 9 | 0.816667 | 294 | 7 | 0 |
| 10 | 0.933333 | 336 | 8 | 0 |
| 11 | 1 | 0 (360) | 8 (8.571429) | 18724 (18724.57) |
| 12 | 1.05 | 18 | 9 | 0 |
| 13 | 1.111111 | 40 | 10 | 0 |
| | . | . | . | . |
| | . | . | . | . |
| 14 | 6.883333 | 318 | 59 | 0 |
| 15 | 7 | 0 | 60 | 0 |
| 16 | 7.058333 | 21 | 60 (60.5) | 16384 |
| 17 | 7.116667 | 42 | 61 | 0 |
| | . | . | . | . |
| | . | . | . | . |
| 18 | 14 | 0 | 120 | 0 |
| | . | . | . | . |
| | . | . | . | . |
| | . | . | . | . |

VERTICAL INJECTION MOLDING MACHINE

The present application is based on and claims priority of Japanese patent application No. 2005-113474 filed on Apr. 11, 2005, and Japanese patent application No. 2006-052008 filed on Feb. 28, 2006, the entire contents of which are hereby incorporated by reference.

BACKGROUND OF THE INVENTION

1. Field of the Invention

The present invention relates to a vertical injection molding machine for molding a product by clamping and releasing molds in the vertical direction, and more specifically, relates to a vertical injection molding machine having a turntable to which molds are mounted.

2. Description of the Related Art

Heretofore, a so-called two-station type vertical injection molding machine has been used, wherein two lower molds mounted on a turntable are moved to positions capable of being clamped with a single upper mold by the revolving motion of the turntable, and the molds are clamped in the vertical direction. According to this so-called two-station type vertical injection molding machine in which a plurality of lower molds are clamped with an upper mold, a mold product having a metallic insert component integrally molded with resin is manufactured by assembling a metallic component for insert-molding to the lower mold positioned on the opposite side from the lower mold being clamped with the upper mold during a mold clamping process, and after completing assembling, revolving the turntable to a predetermined position so as to clamp the lower mold having the metallic component assembled thereto with the upper mold.

In order to produce such molded products in which metallic insert components are integrally molded with resin, it is necessary to assemble the insert component in advance to one of the molds before clamping the molds, so the lower molds being revolved together with the revolving movement of the turntable must be stopped accurately without displacement at predetermined positions capable of being clamped with the upper mold. FIG. 10 is an explanatory view showing the relevant portion of such two-station type vertical injection molding machine according to the prior art described above, which will now be described in detail with reference to the drawing. According to the illustrated vertical injection molding machine, a turntable 102 on which two lower molds 100 and 101 are mounted is revolved in both clockwise and counterclockwise directions by a servomotor 104 via a timing belt 103. A stopper pin 105 is integrally formed to a lower surface of the turntable 102 on which the lower molds 100 and 101 are mounted that are clamped with the upper mold not shown. When the turntable 102 is revolved by activating the servomotor 104, the stopper pin 105 that moves together with the revolution of the turntable 102 comes in contact with the stopper 106, the state of which is illustrated in FIG. 10, and the lower mold is held at a position capable of being clamped with the upper mold by the stopper pin 105 being pressed against the stopper 106 with predetermined torque until the mold clamping process in which the lower mold 100 and the upper mold are clamped is completed. Japanese Patent Application Laid-Open Publication No. 2002-172646 (patent document 1) discloses a prior art turntable of an injection molding machine having a structure related to the art described above.

However, since according to the vertical injection molding machine of FIG. 10, the stopper pin is repeatedly pressed against the stopper for each molding process by the revolution of the turntable in both directions, the contact portions of the stopper pin and the stopper are both worn. When the vertical injection molding machine is operated for a long period of time, the components such as the stopper pin used for positioning are worn away, making it difficult to stop the lower molds at predetermined positions. Moreover, if the vertical injection molding machine is continuously operated in the state in which the contact portions are worn away, the molds subjected to clamping are displaced from the predetermined positions, and in some cases, the molds may even be damaged during clamping. Further, since it is necessary to replace worn components such as the stopper pin and the stopper periodically, the replacement of worn components requires much time and work, and the operation of the molding machine must be interrupted each time the component is to be replaced, so that the manufacturing costs of molded products are increased in vertical injection molding machines producing molded products having insert components made of metal or the like integrally molded with resin.

Further, when the stopper pin collides against the stopper, not only the stopper pin and the stopper but also the drive system of the turntable may be damaged. Therefore, it becomes necessary to stop the turntable without fail immediately before the stopper pin contacts the stopper, which is enabled by taking a large reduction distance before the stop position. However, by increasing the reduction distance, the time required from the starting of the revolution of the turntable to the stopping thereof is increased, and as a result, the overall molding cycle is elongated. Further, as in the case with the two-station type vertical injection molding machine having two molds mounted on the turntable as shown in FIG. 10, if the two molds on the turntable are revolved in reciprocating motion for 180 degrees at a time with the revolution of the turntable, the lower molds can be stopped at predetermined positions by having a stopper pin contact a stopper fixed to a base or the like, but in a three-station machine or a four-station machine, the turntable must be revolved for 120 degrees at a time in the former machine and 90 degrees at a time in the latter machine in the same revolving direction, which requires a complex mechanism or control system to engage or release the stoppers correspondingly, not only deteriorating reliability but also increasing costs.

Furthermore, according to the example illustrated in FIG. 10, the turntable is stopped by having the stopper pin press against the stopper, but if such structure is not adopted and the revolving turntable is stopped only by the control of the servomotor being the drive source of the turntable, the turntable not only fails to stop within a predetermined range but also the stop position is displaced greatly along with the passing of turntable operation time. Therefore, the inventors of the present invention have conducted various tests, and arrived at the following conclusions regarding the mechanism of dispersion of the stop position of the turntable.

According to test results, when the turntable revolution is reduced and stopped, if the rotational resistance of the turntable is smaller than the rotational inertia thereof, the turntable continues to revolve by inertia resisting against the rotational resistance even when the servomotor is at reduction, so the turntable overruns the predetermined stop position and stops at an overrun position even when the servomotor performs a turntable positioning control. On the other hand, if the rotational resistance of the turntable becomes greater than the rotational inertia, the force acts in the opposite direction, and as a result, the turntable tends to stop before the predetermined stop position. Thus, the present inventors have discovered that the rotational resistance of the turntable is influenced by the sliding conditions of the sliding portions of the turntable or the shaft bearing portion, and especially influenced greatly by the sliding conditions of the sliding portions of the turntable having a large sliding resistance. When the sliding portions are fed with sufficient amount of lubricant and the sliding conditions thereof are good, the rotational resistance is small, but when the sliding portions lack lubricant and the sliding conditions thereof are poor, the rotational resistance is increased correspondingly. Therefore, the dispersion in the stop position of the turntable is recognized to be caused mainly by the sliding resistance being varied greatly, which is caused by the change in sliding conditions of the sliding portions of the turntable.

Furthermore, in order to detect the stop position of the turntable mentioned above, the number of revolutions of the servomotor acting as the drive source for revolving the turntable is output to an encoder, and via the count of pulses output from the encoder, the stop position of the turntable revolving with the servomotor can be detected, and thus, the position of the turntable, or angle, can be detected accurately. Now, if four molds are mounted on the turntable so as to realize a four-station machine that revolves 90 degrees at a time, and the turntable is to be revolved continuously in the same direction, by adopting the prior art stopper method, the accurate position of the turntable or angle thereof can be detected by resetting the encoder pulses when the turntable is revolved for 90 degrees at a time and comes into contact with the stopper. However, in a device that does not utilize the stopper, the number of pulses of the encoder will increase continuously and finally exceed a maximum number of pulses countable by the encoder if the turntable is continuously revolved in the same direction, and the accurate position of the turntable, that is, the angle of the turntable, can no longer be detected. In order to prevent this problem from occurring, it is necessary to reset the count before the number of pulses exceeds the maximum number of pulses countable by the encoder, but it is difficult to detect the position or angle of the turntable accurately without a stopper and to reset the count.

SUMMARY OF THE INVENTION

The present invention aims at solving the above-mentioned problems. The object of the present invention is to provide a vertical injection molding machine capable of feeding lubricant periodically to the sliding portion of the turntable in order to maintain a constant slide resistance of the turntable, and also capable of positioning the repeatedly revolving turntable.

A first aspect of the present invention relates to a vertical injection molding machine comprising a retention plate having a lower portion to which an upper mold is mounted, and a turntable having an upper portion to which a lower mold forming a cavity with the upper mold is mounted, the turntable or the retention plate being moved up and down to clamp and release the upper and lower molds; wherein during operation of the vertical injection molding machine having one or more lower molds mounted on the turntable and the upper mold mounted on the retention plate, lubricant is fed periodically from a lubricant feeding device to a sliding portion of the revolving turntable to thereby maintain a substantially constant slide resistance of the sliding portion, so as to enable the repeatedly revolved turntable to stop at predetermined positions; the vertical injection molding machine further comprising a reduction mechanism for setting the number of revolutions of the turntable and the number of revolutions of the servomotor acting as the drive source of the turntable to integers; an encoder for storing the number of revolutions of the servomotor and outputting the number of revolutions of the servomotor as pulses; and a control means for resetting the count of pulses output from the encoder at a timing at which the number of revolutions of the servomotor and the number of revolutions of the turntable are integers.

According to the first aspect of the invention, the slide resistance of the sliding portion of the turntable revolved during operation of the vertical injection molding machine can be maintained substantially constant, and thus the turntable can be stopped at predetermined positions. Further, the control means resets the pulses recorded in the encoder at a timing at which the number of revolutions of the servomotor is an integer and the number of revolutions of the turntable is also an integer. Therefore, the error of pulses caused by resetting the pulse counts per a single revolution of the turntable is no longer accumulated, and the position of the turntable can be determined accurately without error even when the turntable is revolved repeatedly for many times to the same direction.

BRIEF DESCRIPTION OF THE DRAWINGS

FIG. 8 is a comparison chart showing the relationship between the number of revolutions of the servomotor, the encoder pulses and the number of revolutions of the turntable according to embodiment 2;

DETAILED DESCRIPTION OF THE PREFERRED EMBODIMENTS

Now, the preferred embodiments for carrying out the present invention will be described with reference to FIGS. 1 through 9. The technical scope of the present invention is not restricted to the language used in the embodiments, and is extended to the range in which a person skilled in the art could easily substitute based on the present disclosure.

Embodiment 1

Figure 1:
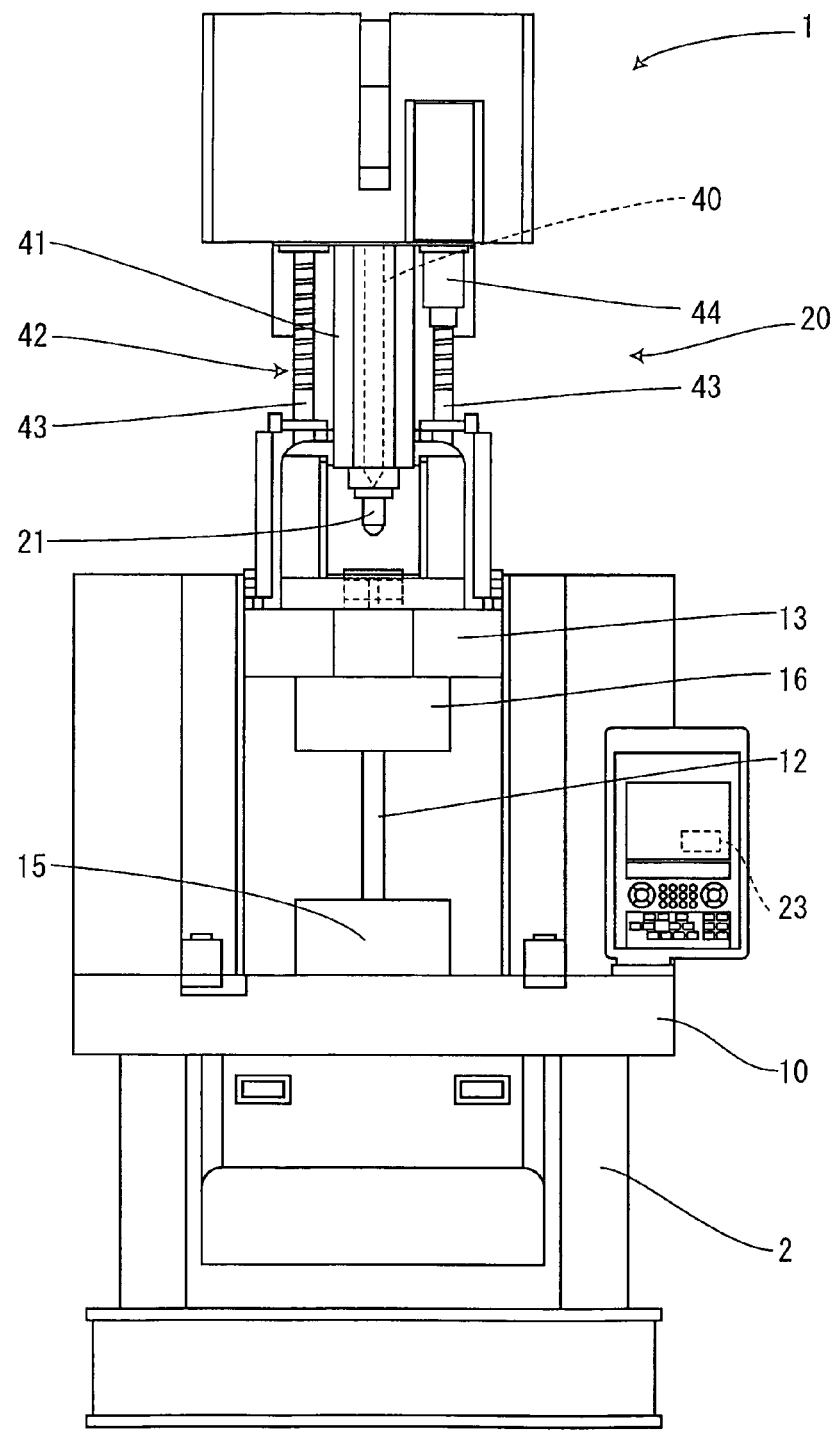
FIG. 1 is a front view of a vertical injection molding machine according to embodiment 1.
Figure 2:
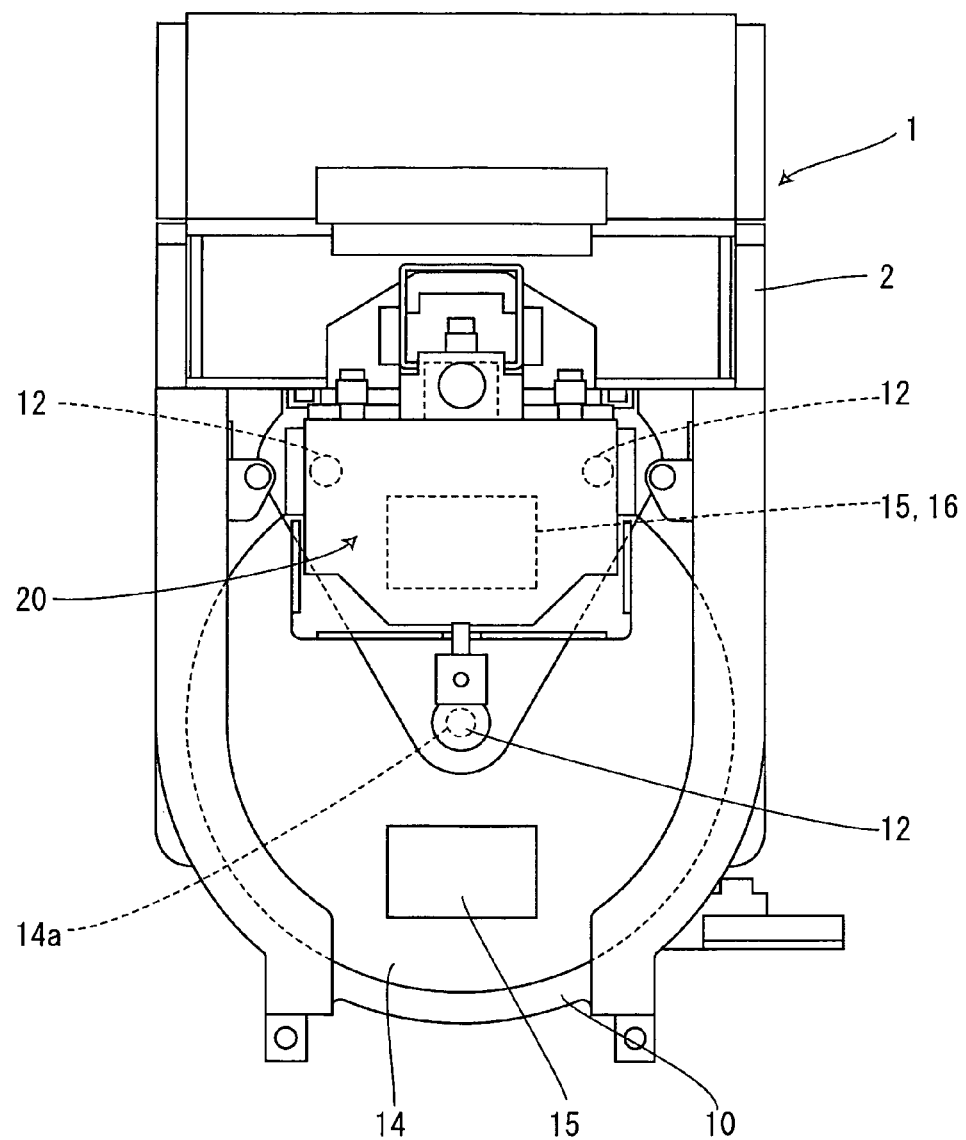
FIG. 2 is a plan view of the vertical injection molding machine according to embodiment 1.
Figure 3:
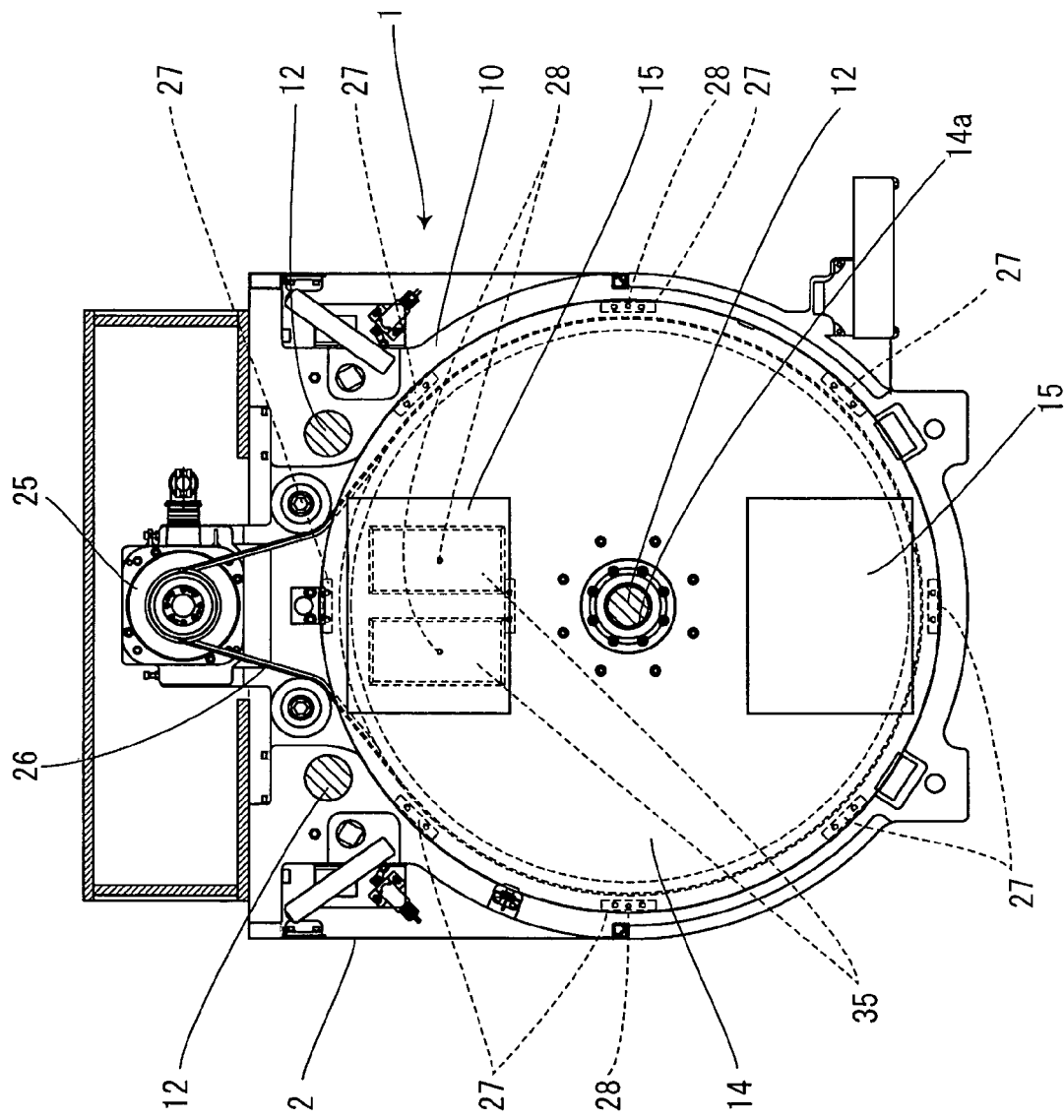
FIG. 3 is a cross-sectional view showing the relevant portion of the vertical injection molding machine according to embodiment 1 from above.
Figure 4:
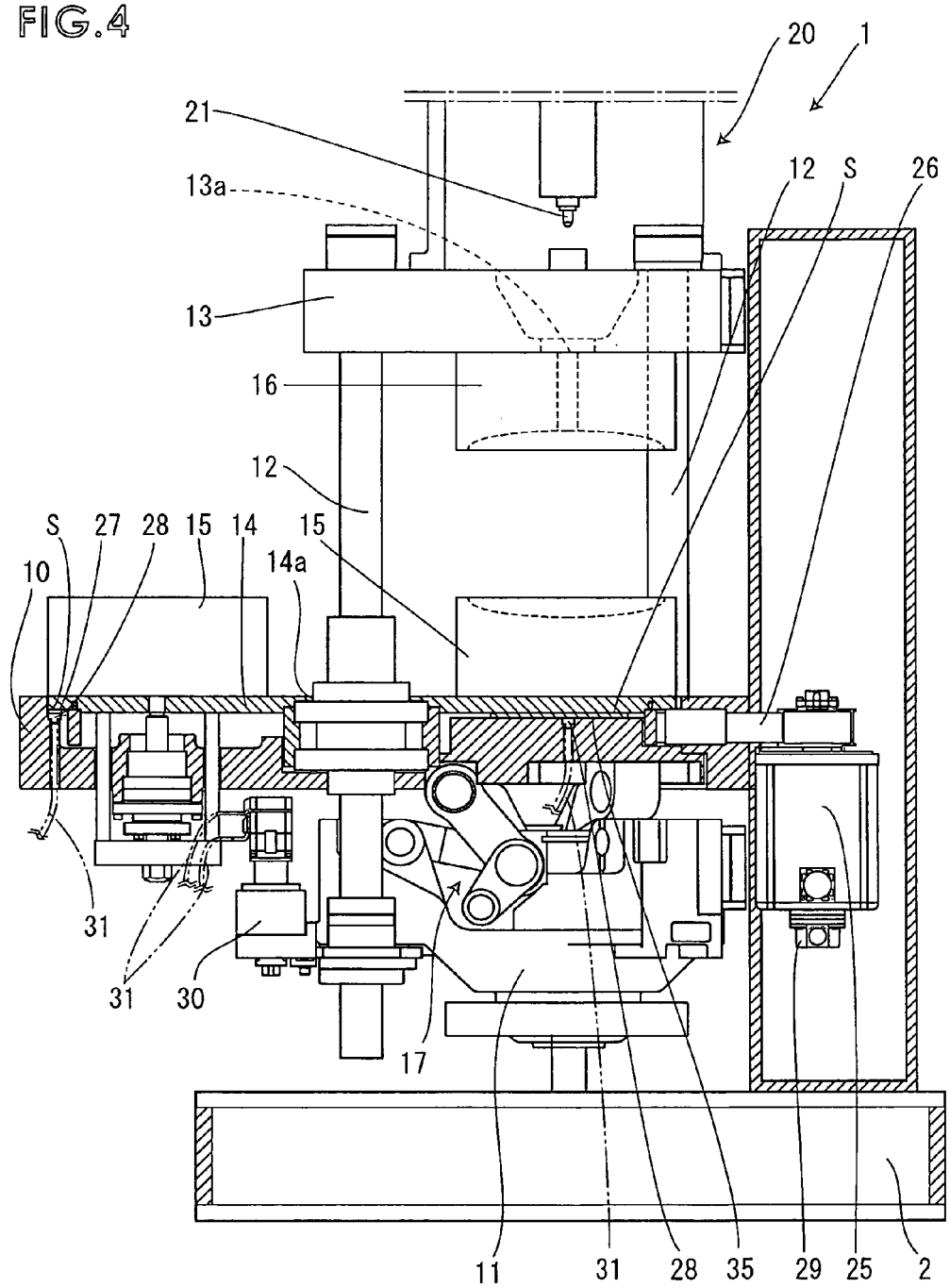
FIG. 4 is a cross-sectional view showing the relevant portion of the vertical injection molding machine according to embodiment 1.
Figure 5:
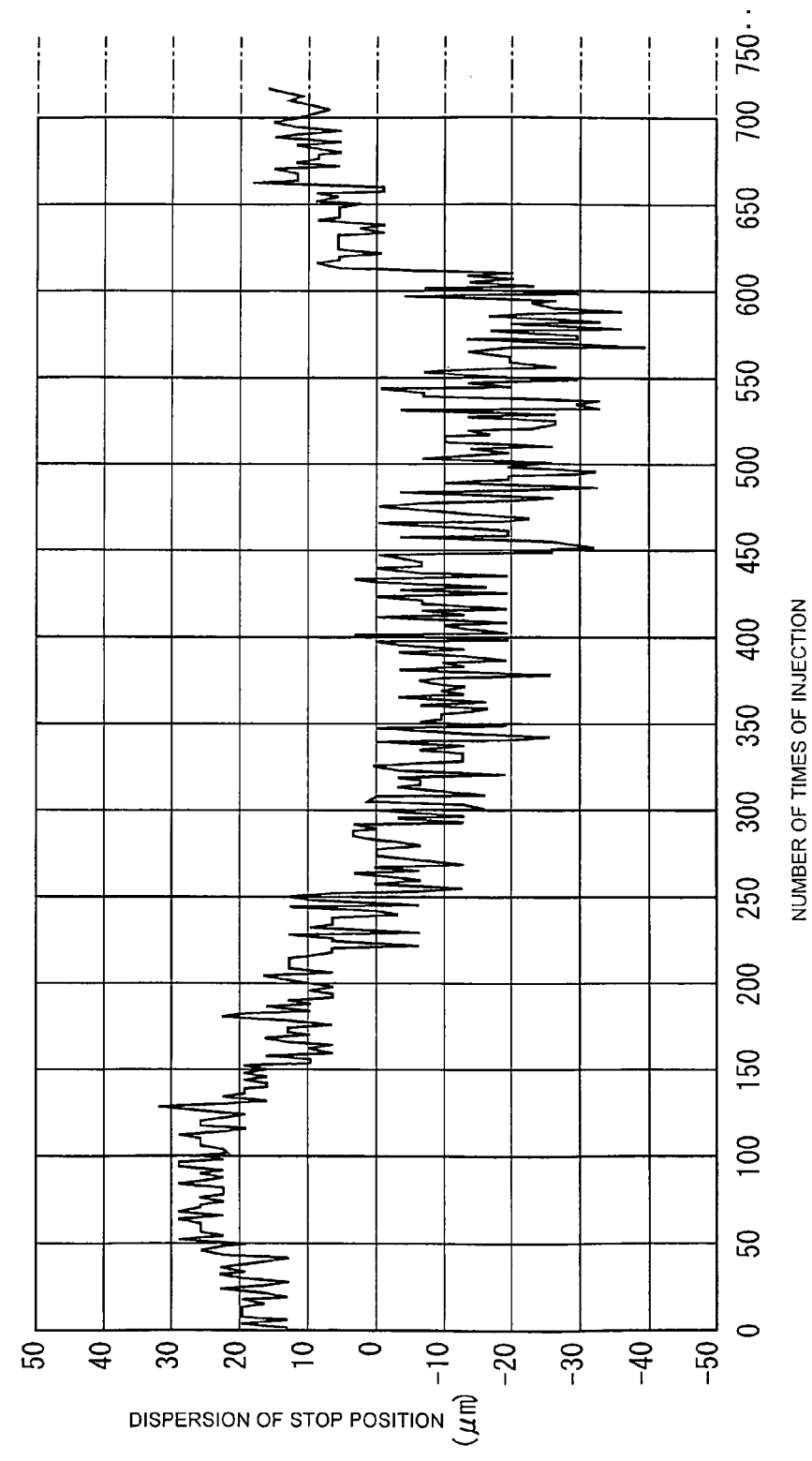
FIG. 5 is a graph showing the stopping accuracy of the turntable according to embodiment 1.

FIG. 1 is a front view of a vertical injection molding machine according to embodiment 1, FIG. 2 is a plan view of the vertical injection molding machine, FIG. 3 is a cross-sectional view showing the relevant portion of the vertical injection molding machine from above, FIG. 4 is a cross-sectional view showing the relevant portion of the vertical injection molding machine, and FIG. 5 is a graph showing the stopping accuracy of the turntable.

The vertical injection molding machine 1 illustrated in FIG. 1 is for forming a molded member by integrally molding an insert component such as a metal component with resin by opening and closing a mold in the vertical direction. An intermediate retention plate 10 is fixed to a machine base 2 of the vertical injection molding machine 1, and an upper retention plate 13 is placed above the intermediate plate with a space therebetween, and as shown in FIG. 4, three cylindrical tie bars 12 erected to the upper and lower retention plates 13 and 11 are passed through the intermediate retention plate 10 so that the upper and lower retention plates 13 and 11 can be moved up and down in the vertical direction. The lower retention plate 11 is connected to the intermediate retention plate 10 fixed to the machine base 2 via a toggle link mechanism 17, and the lower retention plate 11 is moved up and down by the expansion and contraction of the toggle link of the toggle link mechanism 17, by which the upper retention plate 13 connected to the lower retention plate 11 via tie bars 12 is moved up and down to clamp and release the molds.

As shown in FIG. 3, a rotatable disk-shaped turntable 14 is attached to the upper portion of the intermediate retention plate 10, and a cavity is formed by clamping each of the two lower molds 15 mounted on the upper portion of the turntable 14 and a single upper mold 16 mounted on the lower portion of the upper retention plate 13. Moreover, the lower retention plate 11 is moved up and down in the vertical direction via the expansion and contraction of the toggle link of the aforementioned toggle link mechanism by a drive means such as a motor not shown, and the upper mold 16 is moved with respect to the lower mold 15 to clamp and release the molds by having the upper retention plate 13 to which the upper mold 16 is attached move up and down.

Further, an injection unit 20 is provided above the upper retention plate 13, and molten resin is fed into the cavity with the tip of an injection nozzle 21 formed to the injection unit 20 pressed against a resin inlet 13a on the upper mold 16 mounted on the upper retention plate 13. According to FIGS. 1 and 4, the injection nozzle 21 of the injection unit 20 is not in contact with the resin inlet 13a, but during injection, the revolution of a motor 44 is converted via a ball screw mechanism 42 into a linear movement by a nut body not shown engaged to a screw shaft 43 to move the injection unit 20 downward so that the tip of the injection nozzle 21 will be in contact with the resin inlet 13a, creating a so-called nozzle-touch status.

Next, the turntable 14 will be described in detail. A microcomputer 23 which is a control means drives a servomotor 25 to thereby revolve the turntable 14 in connection with the servomotor 25. According to one example of the invention, one tie bar arranged at the front side of the vertical injection molding machine 1 out of the three tie bars 12 arranged vertically is set as the axis or center of revolution of the turntable 14, and as shown in FIGS. 3 and 4, the hole 14a of the turntable 14 is fit to one of the three tie bars 12, so that by driving the servomotor 25, the turntable 14 mounted on the intermediate retention plate 10 is slid and revolved via a timing belt 26 suspended between the turntable 14 and the servomotor 25. In further detail, the turntable 14 is slid and revolved with the lower surface of the turntable 14 being in contact with a plurality of metal portions 27 disposed integrally with the upper surface of the intermediate retention plate 10. Further, the servomotor 25 is equipped with an encoder 29, and the encoder 29 is used to perform feedback-control of the position and speed in order to stop the servomotor 25 at a predetermined position so as to determine the position of the turntable 14.

Reference number 30 denotes a pump functioning as a lubricant feeding device for feeding lubricant such as grease to sliding portions S between the turntable 14 and the metal portions 27 and also between the turntable 14 and a support plate 35 described in detail later. One end of pressure-proof tubes 31 are connected to the pump 30, and the other (opposite) ends of the pressure-proof tubes 31 are connected to feed holes 28 formed to the intermediate retention plate 10 by screwing thereto nipples having through holes formed in the axial direction. The microcomputer 23 controls to feed the lubricant from the pump 30 via the pressure-proof tubes 31 to the sliding portions S of the turntable 14 periodically at predetermined intervals, such as per every 600 shots of resin injection to the cavity. Thus, the slide resistance of the sliding portions S can be maintained substantially at a constant level, so that the multiple lower molds 15 mounted to the turntable 14 can be sequentially stopped at predetermined clampable positions under and facing the upper mold 16 when the vertical injection molding machine 1 is operated continuously.

Furthermore, as shown in FIG. 4, a support plate 35 is attached integrally to the intermediate retention plate 10 on the lower surface of the turntable 14 on which the lower mold 15 is attached, and when the turntable 14 is revolved, the support plate 35 of the intermediate retention plate 10 slid with the turntable 14 provides sufficient supporting force to endure the mold clamping force applied when the upper mold 16 is lowered and clamped onto the lower mold 15.

During measurement of the resin for the injection unit 20, a screw 40 is rotated in the predetermined direction to mix and plasticize the resin material fed to the upper base-side end of a heating cylinder 41, and the resin is sent into the injection nozzle 21 placed at the leading end of the screw 40 via the screwing action of the screw 40. Along with the pooling of molten resin at the leading end of the screw 40, the screw 40 is retreated while having its back pressure controlled, and when a predetermined amount of molten resin is pooled at the leading end of the screw 40, the rotation of the screw 40 is stopped.

Upon injecting molten resin into the cavity during operation of the vertical injection molding machine 1, the rotation of a screw shaft is converted into a linear movement via the screw shaft of the ball screw mechanism and a nut body not shown screw-engaged to the screw shaft, by which the screw 40 is moved in the forward direction. By this movement, the molten resin pooled at the leading end of the screw 40 is injected and filled into the cavity defined by the upper mold 16 and lower mold 15.

In a two-station type vertical injection molding machine 1 according to the present embodiment having an upper mold 16 attached to the upper retention plate 13 and two lower molds 15 to be clamped with the upper mold 16 mounted on the turntable 14, the lower molds 15 are mounted on the upper portion of the turntable 14 along a line in the direction of the diameter passing the center of revolution of the turntable 14, so that the two lower molds 15 are arranged at even angular intervals of 180 degrees on the turntable 14 with respect to the single upper mold 16. When the clamping of the upper mold 16 and one lower mold 15 is released, the microcomputer 23 controls the servomotor 25 to revolve the turntable 14 for 180 degrees so that the other lower mold 15 on the turntable 14 faces the upper mold 16, and thereafter, the lower mold 15 and the upper mold 16 are clamped again. Then, molten resin is injected through the injection nozzle 21 into the cavity, and the resin inside the cavity is cooled. Metal components or the like for insert molding are assembled by robots or manually by operators to the other lower mold 15 arranged on the 180-degree opposite side of the lower mold 15 being clamped, so that by repeating this process, a molded body having an insert component integrally molded with resin is produced.

Next, the stopping position accuracy of the revolving turntable will be described. FIG. 5 is a graph showing the stopping accuracy of the turntable in which the relationship between the stop position of the turntable and the number of injections is illustrated. As described earlier, while the vertical injection molding machine 1 was in operation to form mold products continuously by repeatedly injecting molten resin into cavities, the microcomputer 23 controlled the operation of the pump 30 to periodically supply lubricant to the sliding portions S between the turntable 14 and the plural metal portions 27 formed integrally to the upper surface of the intermediate retention plate 10 and between the turntable 14 and the support plate 35 once per every 600 shots of injection of molten resin, and the results illustrated in the graph were thus obtained. In this graph, the predetermined stopping position of the turntable 14 set in advance is shown as "0" on the vertical axis, the dispersion of the stopping position which is the difference between the stopping position being set and the actual stopping position is shown by a positive numeral if the stopping position is on the overrun side of the turntable 14 and by a negative number if the stopping position is on the short side, and the number of shots of molten resin is shown in the horizontal axis. When a predetermined amount of lubricant is periodically supplied to the sliding portions S from the pump 30 per every 600 shots, the slide resistance of the sliding portions S of the continuously operating vertical injection molding machine 1 can be maintained substantially constant, and the revolving turntable 14 can be stopped without fail within the very limited predetermined allowable range (plus or minus 50 micrometers), actually within the range of plus or minus 40 micrometers. Accordingly, the multiple lower molds 15 mounted at even intervals such as 180 degrees on the turntable 14 can be stopped without fail at the predetermined position facing the upper mold 16, and the molded products having insert components integrally formed thereto can be produced efficiently. Thus, the present embodiment enables to prevent the deterioration of production efficiency caused by stopping the operation of the molding machine for maintenance, which was necessary according to the prior art machine.

The example described above relates to a two-station type vertical injection molding machine 1 in which two lower molds 15 are mounted on the turntable 14, but the same effects can be exerted by using a single station machine in which a single lower mold 15 is mounted on the turntable 14, or a four-station machine in which four lower molds 15 are mounted in a cross-shape on the turntable 14 at 90-degree intervals. Since the present embodiment does not adopt the prior art system of the vertical injection molding machine in which the turntable is turned in both directions for 180 degrees and a stopper pin is pressed against a stopper to stop the lower molds at predetermined positions corresponding to the upper mold, other various examples are possible, such as moving four lower molds 15 mounted on the turntable to mold clamping positions by turning the turntable in the same direction for 90 degrees at a time and not in both directions, by which the same effects as the present embodiment are achieved.

According to the vertical injection molding machine 1 of the above-mentioned embodiment, the upper retention plate 13 having the upper mold 16 mounted thereto is moved down and up to clamp and release the molds, but if necessary, the intermediate retention plate 10 can be moved up and down to clamp and release the molds, and further, the timing for assembling the insert components can be determined arbitrarily.

Further, the microcomputer 23 can control the feeding of lubricant not based on the number of injections such as per 600 shots, but based on predetermined time intervals during the operation time of the vertical injection molding machine computed by the microcomputer 23. Even according to this example, the slide resistance during operation can be maintained substantially constant.

As explained, according to the vertical injection molding machine 1 of the present invention, lubricant is supplied periodically to the sliding portions S of the turntable 14 to maintain a substantially constant sliding resistance of the turntable, and as a result, the turntable 14 being revolved repeatedly can be stopped at predetermined positions. According to a vertical injection molding machine 1 comprising an upper retention plate 13 having an upper mold 16 mounted to the lower portion thereof and a turntable 14 having lower molds 15 mounted to the upper portion thereof that form a cavity with the upper mold 16, the molds are clamped and released by moving either the turntable 14 or the upper retention plate 13 up and down, wherein the turntable 14 has one or more lower molds 15 mounted thereto and the upper retention plate 13 has one upper mold 16 attached thereto. During operation of this vertical injection molding machine 1, lubricant is fed periodically from a pump 30 acting as a lubricant feeding device to sliding portions S of the turntable 14 being revolved, so as to maintain a substantially constant slide resistance of the sliding portions S, in order to enable the one or more lower molds 15 revolved together with the turntable 14 to stop at predetermined mold clamping positions corresponding to the upper mold 16. Thus, it is no longer necessary to adopt the prior art method of using a stopper pin revolved together with the revolving turntable that contacts a fixed stopper and presses against the stopper to hold the lower mold to a predetermined stopping position for mold clamping, and the work load related to replacing the worn stopper pin and stopper is no longer necessary. Therefore, the present invention enables to reduce the load of maintenance operation and to improve the production efficiency for manufacturing molded products by providing a vertical injection molding machine 1 capable of being operated continuously for a long period of time.

Furthermore, a microcomputer 23 is provided as a means for counting the number of injections of molten resin into the cavity and controlling the operation of the pump 30 functioning as a lubricant feeding device based on the counted number of injections, and the pump 30 is periodically operated per every predetermined number of injections, such as every 600 shots, determined in advance by the microcomputer 23 to feed lubricant to the sliding portions S. According to this arrangement, the microcomputer 23 controls and operates the pump 30 to feed lubricant periodically to the sliding portions S based on the number of injections of molten resin into the cavity during operation of the vertical injection molding machine 1, so that when the vertical injection molding machine 1 is operated for a long period of time during which the turntable 14 is repeatedly revolved, the lower molds 15 can be stopped at the predetermined positions capable of being clamped with the upper mold 16 for a long period of time.

Moreover, as shown in FIG. 3, since at least two lower molds 15 can be mounted at even intervals with respect to the center of revolution of the turntable 14 along a line connecting the center thereof, when two lower molds 15 are attached to the turntable 14, the turntable is revolved for 180 degrees at a time in even angles to have the two lower molds 15 stop at predetermined positions corresponding to the upper mold. Accordingly, unlike the prior art method of stopping the turntable in which the wear of stopper and other components causes the stopping position to be varied, the present invention can have the molds clamped without displacement.

When four lower molds 15 are disposed at even intervals with respect to the center of revolution of the turntable 14 and along a crossing line passing the center thereof, the turntable 14 with the four lower molds 15 is revolved in a certain direction and for ninety degrees at a time to have each lower mold 15 stop at predetermined positions corresponding to the upper mold 16.

Further, even when multiple lower molds 15 are mounted on the turntable 14 at equal radial distance from the center of revolution of the turntable 14 but at uneven arbitrary angular intervals with the center set to the center of revolution of the turntable, the lubricant being fed periodically from the pump 30 to the sliding portions S of the rotating turntable 14 enables the slide resistance of the sliding portion S to be maintained substantially constant and thus enables the lower molds 15 revolved together with the turntable 14 to be stopped at predetermined positions.

A preferred embodiment of the present invention related to a two-station type vertical injection molding machine 1 has been described in detail above with reference to FIGS. 1 through 5, but the present invention is not limited to the two-station machine, and can be applied to the four-station machine described earlier, a three-station machine in which three lower molds are mounted at 120-degree intervals on the turntable and the turntable is revolved sequentially in a certain direction for 120 degrees at a time, or a multiple station machine having arbitrary number of molds, such as a five-station machine or a six-station machine.

Embodiment 2

Figure 6:
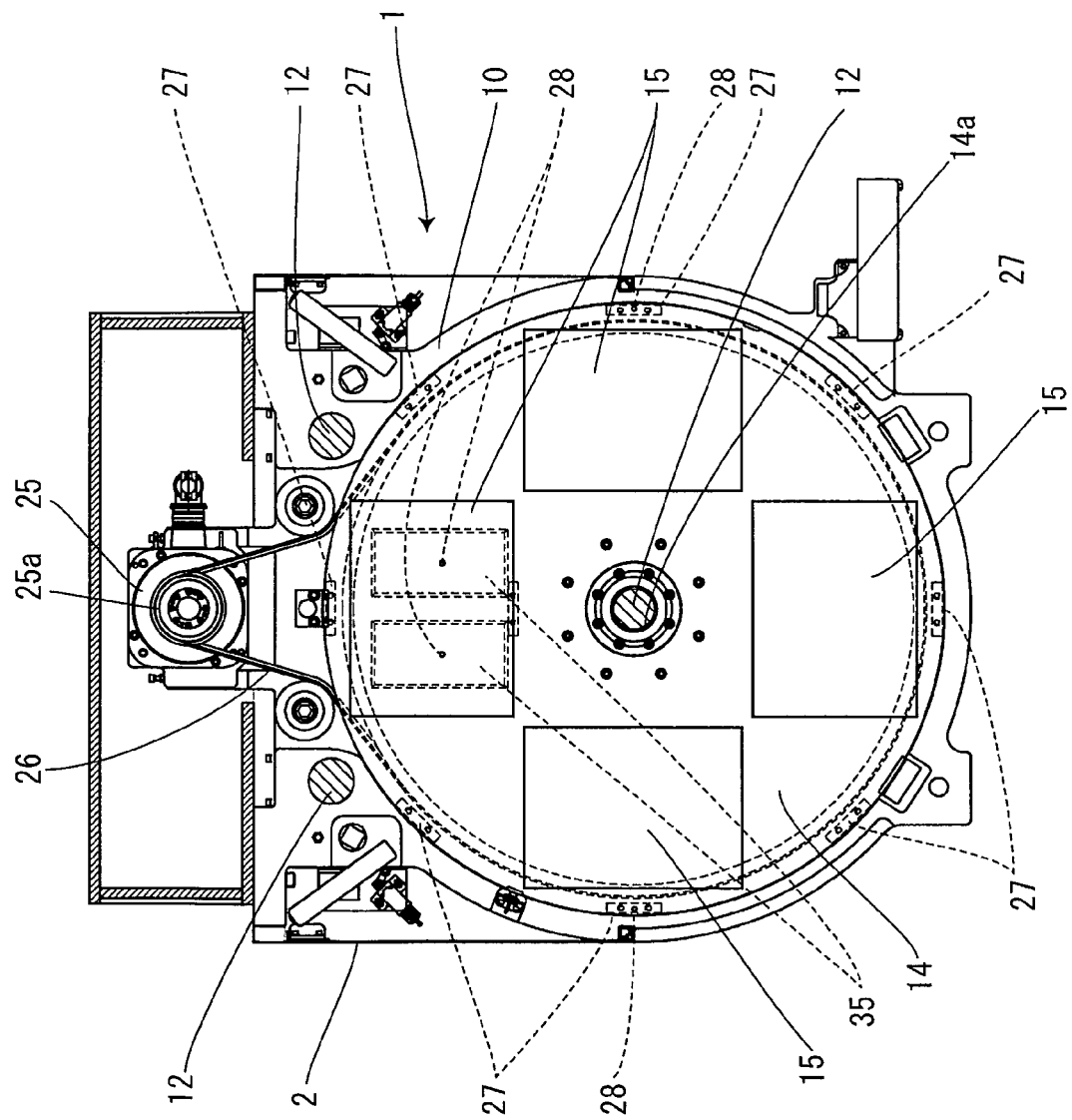
FIG. 6 is a cross-sectional view showing a vertical injection molding machine according to embodiment 2 from above.
Figure 7:
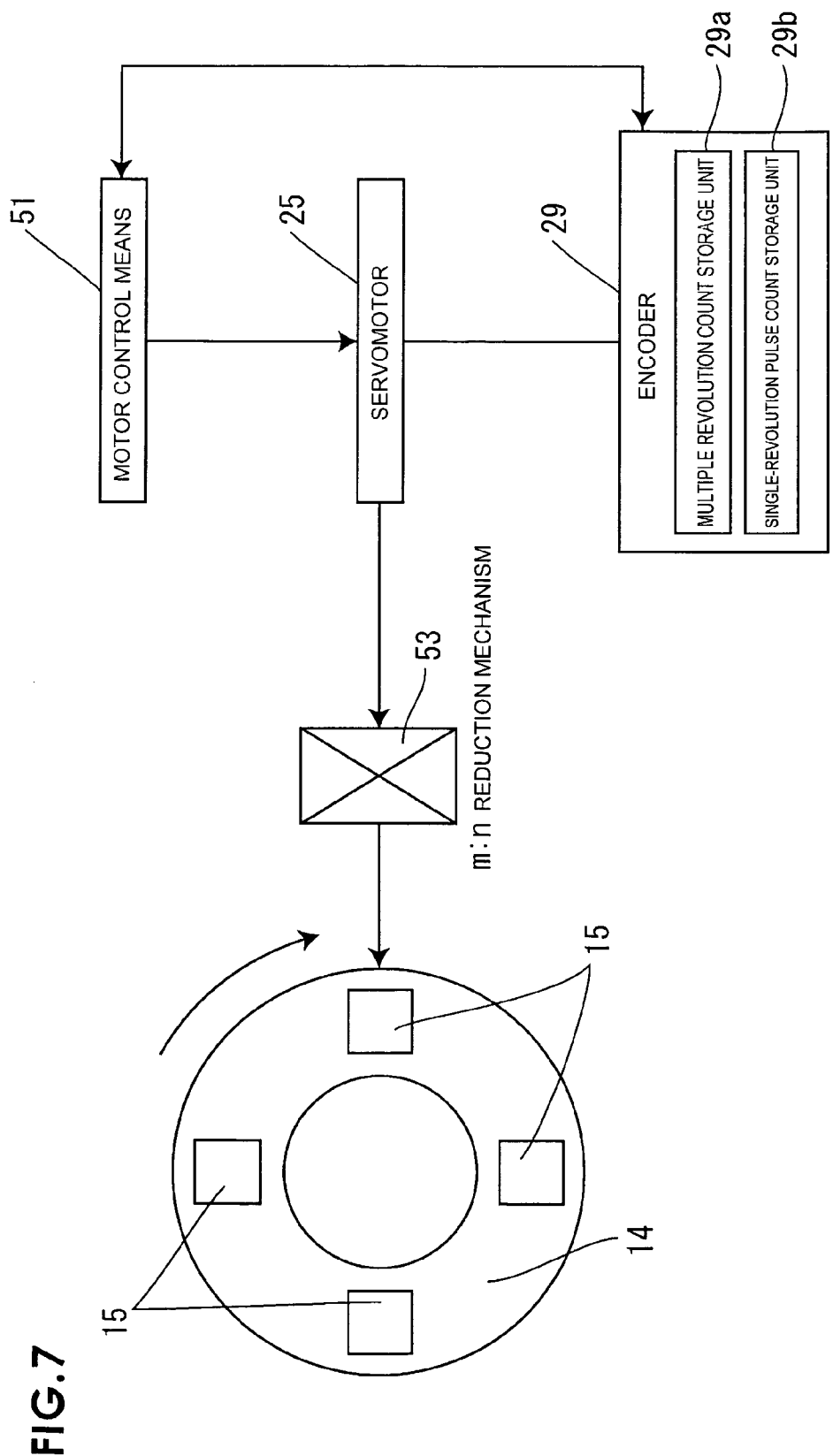
FIG. 7 is a block diagram showing the outline of the structure for revolving the turntable according to embodiment 2.
Figure 9:
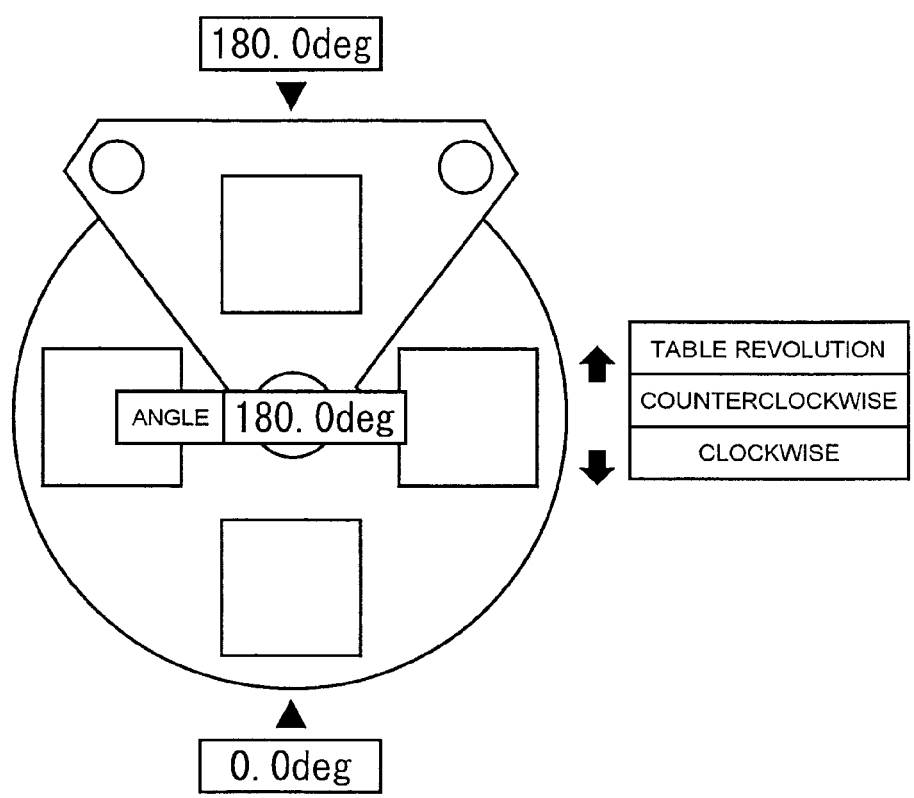
FIG. 9 shows a table revolution setup screen in which the angle of revolution of the turntable is displayed according to embodiment 2.

FIGS. 6 through 9 illustrate a second embodiment of the present invention, wherein FIG. 6 is a cross-sectional view showing the state in which the vertical injection molding machine is viewed from above, FIG. 7 is a block diagram showing the outline of the structure for revolving the turntable, FIG. 8 is a comparison chart showing the relationship between the number of revolutions of the servomotor, the encoder pulses and the number of revolutions of the turntable, and FIG. 9 is an example of the screen for setting up the table revolution. The table revolution setup screen of FIG. 9 illustrates one example of a screen which is a display means of a molding machine control means not shown for controlling the vertical injection molding machine 1 connected to the motor control means 51. The angle (deg) of the table is shown at the center of the table on the screen. This is a screen for displaying the angle (deg) of the turntable 14 corresponding to the revolution of the turntable 14, and since a single revolution corresponds to 360 degrees, ½ revolution is displayed as 180 degrees (the state shown in FIG. 9).

Furthermore, the display of FIG. 9 shows the position of turntable 14 in the state where the turntable is revolved for 0 degrees in the lower direction of the drawing and revolved for 180 degrees in the upper direction of the drawing, so that in the displayed state of FIG. 9, the turntable 14 is revolved for 180 degrees, and the value of the angle displayed at the center shows "180.0 deg". Moreover, a motor control means 51 having programmed in advance the counts of a multiple revolution count storage unit (high order digit) 29a of the encoder 29 and a single-revolution pulse count storage unit (low order digit) 29b of the encoder 29 computes and displays the angle of the turntable 14 on the angle display portion of the screen of FIG. 9.

The present embodiment 2 relates to a four-station vertical injection molding machine 1 in which four lower molds 15 are mounted on the turntable 14 at equal angular intervals of 90 degrees, as illustrated in FIG. 6, and the turntable 14 is revolved sequentially in the same direction for 90 degrees at a time. Further, the present vertical injection molding machine has a substantially equivalent structure as the two-station vertical injection molding machine 1 illustrated in embodiment 1, so the equivalent components are denoted by the same reference numbers as embodiment 1, and detailed descriptions thereof are omitted.

The vertical injection molding machine 1 has a reduction mechanism to set the number of revolutions of the turntable 14 to seven revolutions when the servomotor 25 or drive source is revolved 60 times. In further detail, the reduction ratio of the reduction mechanism 53 is determined by the number of teeth on a pulley 25a mounted on the output shaft of the servomotor 25, a timing belt 26, and the number of teeth on the outer circumference of the turntable 14. In other words, the number of revolutions of the turntable 14 per 60 revolutions of the servomotor 25 is seven, so the reduction ratio (m:n) thereof is 60:7. The vertical injection molding machine 1 further comprises, as shown in FIG. 7, an encoder 29 for outputting the number of revolutions of the servomotor 25 driving the reduction mechanism 53 as pulses, and a motor control means 51 for counting the pulses output from the encoder 29.

Now, we will describe the encoder 29 and the motor control means 51 that counts the pulses output from the encoder and resets the count of pulses and the like. The encoder 29 is an absolute-type encoder, wherein the encoder 29 comprises a multiple revolution count storage unit 29a for detecting and storing the number of revolutions (revolution number) of the servomotor 25, and a single-revolution pulse count storage unit 29b for storing the number of pulses within a single revolution of the servomotor 25. Since the turntable 14 of embodiment 2 is continuously rotated for multiple times in the same direction, the number of revolutions will exceed the maximum detectable number of rotations detectable by the encoder 29, so the motor control means 51 will reset the counter of accumulated pulses before the number reaches the maximum detectable number of revolutions. Incidentally, the maximum value of the multiple revolution count storage unit (high order digit) 29a of the encoder 29 is ±99. In other words, if the number of revolutions of the servomotor 25 exceeds 99 revolutions and reaches 100 revolutions, the multiple revolution count storage unit (high order digit) of the encoder 29 will exceed the maximum value and returns to 0.

As mentioned earlier, according to the present embodiment 2, the reduction ratio of the servomotor 25 and the reduction mechanism 53 of the turntable 14 is 60:7. Therefore, with reference to FIG. 8, we will now describe the relationship between the turntable 14, the servomotor 25 and the number of pulses counted by the encoder 29.

FIG. 8 shows, from the left row, No (which is the number used for description), counts of the number of revolutions of the turntable 14 (n), the angle of the turntable 14 (deg), the number of revolutions of the servomotor 25 (m), the multiple revolution count storage unit (high order digit) 29a of the encoder 29, and the single-revolution pulse count storage unit (low order digit) 29b of the encoder 29.

According to the present embodiment 2, as shown in FIG. 9, if the turntable 14 is revolved in the clockwise direction, the numbers are counted up, and if it is revolved in the counter-clockwise direction, the numbers are counted down. Further, the single-revolution pulse count storage unit (low order digit) 29b of the encoder 29 counts 32768 counts per a single revolution of the servomotor 25, and the multiple revolution count storage unit (high order digit) 29a of the encoder 29 counts 1 per every single revolution of the number of revolutions (m) of the servomotor 25.

First, when it is displayed that the angle is 0 deg in FIG. 9, all counts of the number of revolutions of the turntable 14 (n), the angle of the turntable 14 (deg), the number of revolutions of the servomotor 25 (m), the multiple revolution count storage unit (high order digit) 29a of the encoder 29 and the single-revolution pulse count storage unit (low order digit) 29b of the encoder 29 are zero. In FIG. 8, the column on the left end denoted as No. 1 corresponds to this state. Further, angle 0 degrees is, in general, the original point position, and detailed descriptions thereof are omitted, but the original point position is determined by a original point output means not illustrated.

Next, the table is revolved in the clockwise direction, and when the number of revolutions of the servomotor 25 reaches ½, the single-revolution pulse count storage unit (low order digit) 29b of the encoder 29 counts 16384 pulses, the angle of the turntable 14 becomes 21 degrees and the number of revolutions of the turntable 14 becomes 0.058333 . . . (state shown in No. 2 of FIG. 8).

When the turntable 14 is revolved continuously in the clockwise direction and the angle of the turntable 14 becomes 42 degrees, the number of revolutions of the turntable 14 becomes 0.11666 . . . , the number of revolution of the servomotor 25 becomes 1, the single-revolution pulse count storage unit (low order digit) 29b of the encoder 29 counts 32768 pulses, and the multiple revolution count storage unit (high order digit) 29a of the encoder 29 counts 1 revolution (state shown as No. 3 of FIG. 8). At this time, the encoder 29 increases the count of the multiple revolution count storage unit of the encoder 29 being the high order digit from 0 to 1 when the single-revolution pulse count storage unit (low order digit) 29b of the encoder 29 counts 32768 pulses, and at the same time, resets the single-revolution pulse count storage unit (low order digit) 29b of the encoder 29 to 0. This is because the maximum value of the single-revolution pulse count storage unit (low order digit) 29b of the encoder 29 is 32768, which corresponds to a single revolution of the servomotor 25, that is, a single revolution of the encoder 29.

Thereafter, if the servomotor 25 is continuously revolved for two revolutions, the angle of the turntable 14 becomes 84 degrees (state shown in No. 4 of FIG. 8).

Then, if the turntable 14 is further continuously revolved in the clockwise direction by the revolution of the servomotor 25 from the state shown in No. 5 to No. 11 of FIG. 8, the revolution of the turntable 14 reaches 1 revolution. Here, the computation results of the multiple revolution count storage unit (high order digit) 29a of the encoder 29 is 8.571429 . . . (state shown in No. 11 of FIG. 8). Further, an integer number 8 is stored in the multiple revolution count storage unit (high order digit) 29a of the encoder 29 and the fraction is discarded, but in FIG. 8, the computed value is shown in the brackets.

This shows that since the reduction ratio of the reduction mechanism 53 of the servomotor 25 and turntable 14 is set to 60:7, the servomotor 25 revolves for 8.571429 . . . revolutions when the turntable 14 revolves once, so that the single-revolution pulse count storage unit (low order digit) 29b of the encoder 29 counts 18724.57 pulses. Now, the value stored in the single-revolution pulse count storage unit (low order digit) 29b of the encoder 29 is 18724, but in FIG. 8, the computed value is shown in the brackets.

If the turntable 14 is further continuously revolved in the clockwise direction in the same manner (states shown in No. 12 through No. 14 of FIG. 8), the number of revolutions of the turntable 14 becomes 7 and the number of revolutions of the servomotor 25 becomes 60 (state shown in No. 15 of FIG. 8). At this time, the angle of the turntable 14 becomes 0 degrees, the multiple revolution count storage unit (high order digit) 29a of the encoder 29 counts 60, and the single-revolution pulse count storage unit (low order digit) 29b of the encoder 29 counts 0 (32768) It can be seen that the number of revolutions of the turntable 14 and the number of revolutions of the servomotor 25 are at an integer ratio.

If the turntable 14 is further continuously revolved in the clockwise direction, when the number of revolutions of the turntable 14 becomes 14 and the number of revolutions of the servomotor 25 becomes 120, the numbers again become an integer ratio (the state shown in No. 18 of FIG. 8). Similarly in this state, the multiple revolution count storage unit (high order digit) 29a of the encoder 29 becomes 120, and the single-revolution pulse count storage unit (low order digit) 29b of the encoder 29 becomes zero (32768).

As described, according to the present embodiment 2, since the reduction ratio of the reduction mechanism 53 of the servomotor 25 and turntable 14 is 60:7, the angle (deg) of the turntable 14 becomes zero when the ratio of the number of revolutions of the turntable 14 and the number of revolutions of the servomotor 25 is 7:60, and the number of revolutions of the servomotor 25 becomes an integral multiple value of 60.

Next, as described earlier, the maximum value of the multiple revolution count storage unit (high order digit) 29a of the encoder 29 according to the present embodiment 2 is ±99. That is, if the number of revolutions of the servomotor 25 exceeds 99 and reaches 100, the multiple revolution count storage unit (high order digit) 29a of the encoder 29 exceeds the maximum value and returns to zero. If the multiple revolution count storage unit (high order digit) 29a of the encoder 29 returns to zero, it becomes impossible to know the number of revolutions of the servomotor 25, and therefore, it becomes impossible to detect the number of revolutions of the turntable 14 and the angle (deg) of the turntable 14.

In order to prevent this problem from occurring, it is necessary to reset the multiple revolution count storage unit (high order digit) 29a of the encoder 29 to 0 before the maximum value of the multiple revolution count storage unit (high order digit) 29a of the encoder 29 exceeds 100, in other words, before the number of revolutions of the servomotor 25 exceeds 100 revolutions.

Figure 10:
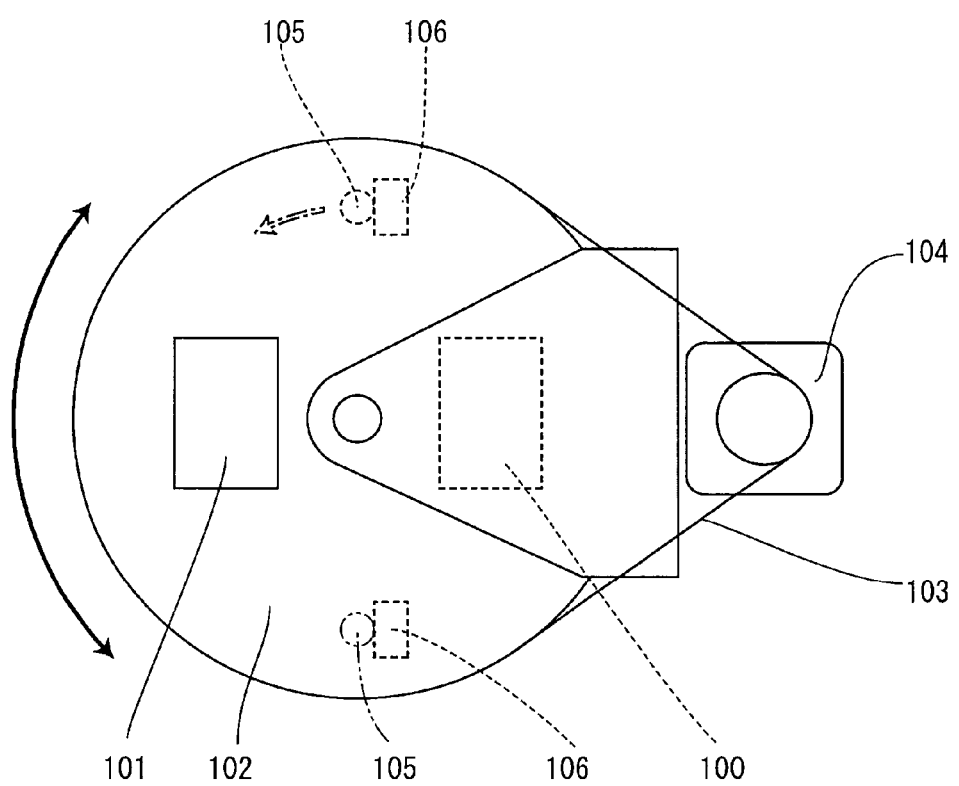
FIG. 10 is an explanatory schematic view showing the relevant portion of a prior art vertical injection molding machine used conventionally.

However, in the case of the prior art example illustrated in FIG. 10, the counter of the encoder is reset when the turntable contacts a stopper or the like, and since the position or angle of the turntable when it hits the stopper or the like is known in advance to be 90 degrees or 180 degrees or the like, so the counter can be reset without fail at a certain angle (at 180 degrees if the stopper is positioned at 180 degrees). Therefore, by counting the pulses from that position, it is possible to detect the accurate angle of the turntable. However, since the stopper is not used according to the present embodiment 2, the accurate position of the turntable 14 must be detected through use of the multiple revolution count storage unit (high order digit) 29a of the encoder 29 and the single-revolution pulse count storage unit (low order digit) 29b of the encoder 29.

In consideration of the above, by having the motor control means 51 reset (set to zero) the multiple revolution count storage unit (high order digit) 29a of the encoder 29 when the number of revolutions of the turntable 14 and the number of revolutions of the servomotor 25 become an integer ratio, it becomes possible to constantly detect the accurate angle (deg) of the turntable 14. This is because if the motor control means 51 resets or sets to zero the multiple revolution count storage unit (high order digit) 29a of the encoder 29 in the state shown in No. 16 of FIG. 8, the number of revolutions (n) of the turntable 14 at that time is also zero, which is equivalent to the state shown in No. 2 of FIG. 8. Then, if the turntable continues to revolve, the counts are increased sequentially in the order of Nos. 3, 4, 5 and so on again, and thus the number of revolutions of the turntable 14 and the angle of the turntable 14 can be continuously detected accurately. Further, at this time, the single-revolution pulse count storage unit (low order digit) 29b of the encoder 29 continues counting. The single-revolution pulse count storage unit (low order digit) 29b of the encoder 29 shows the number of pulses within a single revolution of the servomotor 25, but by continuously counting the same, it becomes possible to continuously count the accurate angle of the turntable 14, so it will not be necessary to reset the single-revolution pulse count storage unit (low order digit) 29b of the encoder 29.

If the single-revolution pulse count storage unit (low order digit) 29b of the encoder 29 is reset, the counts of the number of pulses within a single revolution of the servomotor 25 is lost, and as a result, the angle of the turntable 14 may no longer be detected accurately.

Moreover, the timing for the motor control means 51 to reset the multiple revolution count storage unit (high order digit) 29a of the encoder 29 should be within the state shown in No. 15 to No. 17 of FIG. 8, in other words, from the time when the single-revolution pulse count storage unit (low order digit) 29b of the encoder 29 exceeds zero and just prior to reaching 32768, but if the count is too close to 32768 and the servomotor 25 is revolved in high speed, the count of the single-revolution pulse count storage unit (low order digit) 29b of the encoder 29 may exceeds 32768 and a digit may be increased during the reset process, by which the count of the multiple revolution count storage unit (high order digit) 29a of the encoder 29 is increased erroneously and the correct count may be lost.

Further, if the servomotor 25 repeatedly moves back and forth between pulse 0 and ±1 pulse, which is a position determining process, when the single-revolution pulse count storage unit (low order digit) 29b of the encoder 29 is close to zero, the single-revolution pulse count storage unit (low order digit) 29b of the encoder 29 may reduce one digit, by which the count of the multiple revolution count storage unit (high order digit) 29a of the encoder 20 is reduced erroneously and the correct count may be lost. Therefore, it is desirable that the reset is performed when the single-revolution pulse count storage unit (low order digit) 29b of the encoder 29 is at a count close to the intermediate value between zero and 32768 pulses, or 16384 pulses, that is, the state close to No. 16 of FIG. 8.

As described, by resetting to zero the multiple revolution count storage unit (high order digit) 29a of the encoder 29 at the timing when the number of revolutions of the turntable 14 and the number of revolutions of the servomotor 25 become an integer ratio, the count of the multiple revolution count storage unit (high order digit) 29a of the encoder 29 will not exceed a maximum value even when the turntable 14 continues to revolve in the same direction, and the angle (deg) of the turntable 14 can be detected correctly without error.

Further according to embodiment 2, the multiple revolution count storage unit (high order digit) 29a of the encoder 29 is reset to zero, but it is also possible to have the count reset to any appropriate integer, such as 10 or 20, as long as the reset is performed when the number of revolutions of the turntable 14 and the number of revolutions of the servomotor 25 are an integer ratio and the value of the multiple revolution count storage unit (high order digit) 29a does not exceed the maximum value. Moreover, according to the present embodiment 2, the reset is performed when the number of revolutions of the turntable 14 is 7 and the number of revolutions of the servomotor 25 is 60, but the reset can also be performed, of course, when the number of revolutions of the turntable 14 and the number of revolutions of the servomotor 25 are an integer ratio, such as when the turntable 14 has revolved 14 times and the servomotor 25 has revolved 120 times.

As described, the present invention enables to determine the position of the turntable 14 accurately without error even when the turntable 14 is revolved many times in the same direction.

The effects of the present invention are as follows.

The present invention relates to a vertical injection molding machine comprising a retention plate having a lower portion to which an upper mold is mounted and a turntable having an upper portion to which a lower mold forming a cavity with the upper mold is mounted, the turntable or the retention plate being moved up and down to clamp and release the upper and lower molds; wherein during operation of the vertical injection molding machine having one or more lower molds mounted on the turntable and the upper mold mounted on the retention plate, lubricant is fed periodically from a lubricant feeding device to a sliding portion of the revolving turntable to thereby maintain a substantially constant slide resistance of the sliding portion, so as to enable the repeatedly revolved turntable to stop at predetermined positions; the vertical injection molding machine further comprising a reduction mechanism for setting a number of revolutions of the turntable and the number of revolutions of the servomotor as drive source of the turntable to integers; an encoder for storing the number of revolutions of the servomotor and outputting the number of revolutions of the servomotor as pulses; and a control means for resetting a count of the pulses output from the encoder at a timing at which the number of revolutions of the servomotor and the number of revolutions of the turntable are integers. According to this arrangement, the positioning of the turntable can be performed accurately based on the revolutions of the servomotor.

What is claimed is:

1. A vertical injection molding machine comprising:

a retention plate having a lower portion to which an upper mold is mounted; and a turntable having an upper portion to which a lower mold forming a cavity with the upper mold is mounted, the turntable or the retention plate being moved up and down to clamp and release the upper and lower molds; wherein during operation of the vertical injection molding machine having one or more lower molds mounted on the turntable and the upper mold mounted on the retention plate, lubricant is fed periodically from a lubricant feeding device to a sliding portion of the revolving turntable to thereby maintain a substantially constant slide resistance of the sliding portion, so as to enable the repeatedly revolved turntable to stop at predetermined positions;

the vertical injection molding machine further comprising:

a reduction mechanism for setting a number of revolutions of the turntable and a number of revolutions of the servomotor which is a drive source of the turntable to integers;

an encoder for storing the number of revolutions of the servomotor and for outputting the number of revolutions of the servomotor as a pulse; and a control means for resetting a count of the pulses output from the encoder at a timing at which the number of revolutions of the servomotor and the number of revolutions of the turntable are integers.

* * * * *